United States Patent
Habetha et al.

(10) Patent No.: US 9,119,227 B2
(45) Date of Patent: Aug. 25, 2015

(54) NETWORK ARRAY, FORWARDER DEVICE AND METHOD OF OPERATING A FORWARDER DEVICE

(75) Inventors: Jorg Habetha, Aachen (DE); Adolfo Jose Roque, Ingolstadt (DE); Francesc Dalmases, Barcelona (ES)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 912 days.

(21) Appl. No.: 11/575,777

(22) PCT Filed: Sep. 21, 2005

(86) PCT No.: PCT/IB2005/053103
§ 371 (c)(1),
(2), (4) Date: Mar. 22, 2007

(87) PCT Pub. No.: WO2006/035366
PCT Pub. Date: Apr. 6, 2006

(65) Prior Publication Data
US 2008/0062878 A1 Mar. 13, 2008

(30) Foreign Application Priority Data

Sep. 29, 2004 (EP) .................................... 04104766

(51) Int. Cl.
*H04L 12/28* (2006.01)
*H04L 12/56* (2006.01)
(Continued)

(52) U.S. Cl.
CPC .......... *H04W 92/02* (2013.01); *H04W 72/1252* (2013.01); *H04W 84/18* (2013.01)

(58) Field of Classification Search
CPC . H04W 84/18; H04W 84/12; H04W 72/1215; H04W 88/10; H04W 84/20; H04W 92/02
USPC ......................................... 370/235, 400–405
See application file for complete search history.

(56) References Cited

U.S. PATENT DOCUMENTS 6,216,006 B1 4/2001 Scholefield et al.
2001/0002912 A1 * 6/2001 Tony et al. .................... 370/487
(Continued)

FOREIGN PATENT DOCUMENTS

WO WO 02091682 A1 * 11/2002
WO WO 03026224 A1 * 3/2003
(Continued)

OTHER PUBLICATIONS

Daqing Gu & Jinyun Zhang, "A New Measurement-Based Admission Control Method", IEEE International Symposium on Personal, Indoor and Mobile Radio Communications (PIMRC), vol. 3, pp. 2009-2013, 2003.

(Continued)

*Primary Examiner* — Hoang-Chuong Vu
(74) *Attorney, Agent, or Firm* — Larry Liberchuk

(57) ABSTRACT

A network array (100) comprises a first network (101) having a plurality of first nodes (103, 104, 109), comprises a second network (102) having a plurality of second nodes (106, 109), and comprises a forwarder node (109). The forwarder node (109) constitutes one of the first nodes (103, 104, 109) and constitutes one of the second nodes (106, 109) to form a communication interface between the first network (101) and the second network (102). The forwarder node (109) has an implemented data transmission scheduling management function capable of distinguishing between data to be transmitted between the first network (101) and the second network (102) and data to be transmitted within the first network (101) or within the second network (102). The forwarder node (109) is adapted to communicate with the first network (101) using a first operation frequency and is adapted to communicate with the second network (102) using a second operation frequency which is different from the first operation frequency.

33 Claims, 5 Drawing Sheets

(51) Int. Cl.
*H04W 92/02* (2009.01)
*H04W 72/12* (2009.01)
*H04W 84/18* (2009.01)

(56) References Cited

U.S. PATENT DOCUMENTS

| | | | |
|---|---|---|---|
| 2002/0093929 A1* | 7/2002 | Mangold et al. | 370/336 |
| 2002/0120740 A1* | 8/2002 | Ho et al. | 709/225 |
| 2003/0060222 A1* | 3/2003 | Rune | 455/517 |
| 2003/0076842 A1* | 4/2003 | Johansson et al. | 370/401 |
| 2003/0123467 A1* | 7/2003 | Du et al. | 370/401 |
| 2003/0223365 A1 | 12/2003 | Kowalski | |
| 2004/0090943 A1* | 5/2004 | da Costa et al. | 370/338 |
| 2004/0116075 A1 | 6/2004 | Shoemake et al. | |
| 2004/0133620 A1 | 7/2004 | Habetha | |
| 2004/0136338 A1* | 7/2004 | Lin et al. | 370/329 |
| 2004/0240457 A1* | 12/2004 | Habetha et al. | 370/401 |
| 2004/0258033 A1* | 12/2004 | Heinonen et al. | 370/338 |
| 2005/0063313 A1* | 3/2005 | Nanavati et al. | 370/252 |
| 2005/0086273 A1* | 4/2005 | Loebbert et al. | 707/204 |
| 2006/0030265 A1* | 2/2006 | Desai et al. | 455/41.2 |
| 2006/0084383 A1* | 4/2006 | Ibrahim et al. | 455/41.2 |
| 2006/0089119 A1* | 4/2006 | Lipasti et al. | 455/410 |
| 2006/0285491 A1* | 12/2006 | Miyamoto | 370/230 |

FOREIGN PATENT DOCUMENTS

| | | |
|---|---|---|
| WO | WO 03069855 A1 * | 8/2003 |
| WO | 2004032362 | 4/2004 |
| WO | 2004036838 | 4/2004 |

OTHER PUBLICATIONS

Baatz S et al; "Bluetooth Scatternets: An Enhanced Adaptive Scheduling Scheme", The Conference on Computer Communications, 21st. Annual Joint Conference of the IEEE Computer and Communications Societies, vol. 1 of 3. Conf. 21, pp. 782-790, 2002, XP010593640.

M. Shreedhar and G. Varghese; "Efficient Fair Queuing", PROC ACM SIGCOMM, pp. 231-242, 1995.

R. S. Ranasinghe et al; Scheduling Disciplines for Multimedia WLANs: IEEE Int. Conf. Comm., pp. 1243-1248, 2001.

* cited by examiner

NETWORK ARRAY, FORWARDER DEVICE AND METHOD OF OPERATING A FORWARDER DEVICE

The invention relates to a network array.

The invention further relates to forwarder device.

Beyond this, the invention relates to a method of operating a forwarder device.

Wireless networks can be divided into infrastructure-based networks and self-organizing (ad-hoc) networks. Traditionally, radio networks are usually infrastructure-based. However, interest in self-organizing networks has recently grown owing to the possible ad-hoc deployment of the systems.

In infrastructure networks, communication is provided between wireless clients and wired network resources using a communication hub known as a base station (BS) or access point (AP). A hub is used in telecommunications in order to connect network segments or single computers. Signals originating from a network node are transmitted from a hub to another network node.

In contrast to infrastructure networks, ad-hoc networks do not use a communication hub (AP). Instead, the devices communicate directly with each other in an ad-hoc network. Ad-hoc networks can be created spontaneously, and in an arbitrary manner, and used to support mutual communication among wireless clients.

As there are no central entities in an ad-hoc network, each node in the network functions as a router, forwarding packages to other nodes in the network. This is called multi-hop routing.

Whereas ad-hoc networks were used mainly by the military in the past, today various other applications are foreseen. Examples are Personal Area Networks (PAN) for short range communications and In-house Digital Networks (IHDN) for audio, video and data exchange. First communication standards with ad-hoc capability have already been completed: Bluetooth a wireless PAN, IEEE 802.11, a wireless Local Area Network (WLAN) and Hiper-LAN/2, a WLAN and IHDN.

The coupling of different networks becomes more and more important. For instance, it is in many cases desired that an infrastructure-based network having a communication hub as a master may communicate and exchange data with another network, for instance an ad-hoc network.

As an interface between two such networks, a so-called forwarder device may be implemented to forward a data package coming from a node of one of the networks and being addressed to a node of another one of the networks. However, it is problematic to manage the data package traffic between nodes of different networks in such a network array in an efficient manner.

It is an object of the invention to provide a communication architecture allowing a data transfer between two networks in an efficient manner.

In order to achieve the object defined above, a network array, a forwarder device and a method of operating a forwarder device, according to the independent claims, are provided.

The network array of the invention comprises a first network having a plurality of first nodes, comprises a second network having a plurality of second nodes, and comprises a forwarder node. The forwarder node constitutes one of the first nodes and constitutes one of the second nodes to form a communication interface between the first network and the second network. Further, the forwarder node has an implemented data transmission scheduling management function capable of distinguishing between data to be transmitted between the first network and the second network and data to be transmitted within the first network or within the second network. The forwarder node is adapted to communicate with the first network using a first operation frequency and is adapted to communicate with the second network using a second operation frequency which is different from the first operation frequency.

Moreover, the invention provides a forwarder device for forming a communication interface between a first network and a second network of a network array and for managing data transmission scheduling. The forwarder device is adapted to constitute one of a plurality of first nodes of a first network and is adapted to constitute one of a plurality of second nodes of a second network to form a communication interface between the first network and the second network. Further, the forwarder device has an implemented data transmission scheduling management function capable of distinguishing between data to be transmitted between the first network and the second network and data to be transmitted within the first network or within the second network. The forwarder device is adapted to communicate with the first network using a first operation frequency and is adapted to communicate with the second network using a second operation frequency which is different from the first operation frequency.

Beyond this, a method is provided of operating a forwarder device for forming a communication interface between a first network and a second network of a network array and for managing data transmission scheduling. The method comprises the steps of adapting the forwarder device to constitute one of a plurality of first nodes of a first network and of adapting the forwarder device to constitute one of a plurality of second nodes of a second network to form a communication interface between the first network and the second network. Moreover, the forwarder device has implemented a data transmission scheduling management function capable of distinguishing between data to be transmitted between the first network and the second network and data to be transmitted within the first network or within the second network. The forwarder device is adapted to communicate with the first network using a first operation frequency and to communicate with the second network using a second operation frequency, which is different from the first operation frequency.

The characteristic features according to the invention particularly have the advantage that a sophisticated network architecture is provided having a forwarder node or forwarder device having implemented a very special functionality. This forwarder node fulfils the function of an interface for enabling a communication between nodes of a first network and nodes of a second network and simultaneously manages the schedule for transferring data in either direction. The forwarder node may communicate with the first network using the first operation frequency, and may communicate with the second network using the second operation frequency. The forwarder node may switch or be switched between two operation states and therefore allows the coupling of any two network systems with different operation frequencies or different frequency bands. For instance, the forwarder node may play the role of a slave in the first network and may simultaneously play the role of a master in the second network. However, alternatively, the forwarder node may also play the role of a master in both the first network and the second network. Thus, the forwarder may transfer data packets from nodes of the first network addressed to nodes of the second network, or vice versa.

Apart from the function as an interface for forwarding data packets between nodes of two networks, it is a fundamental aspect of the forwarder device of the invention that it further includes a scheduling function for managing and planning the data packet transfer between the two networks. "Scheduling" refers to the way processes in the network are assigned priorities in a priority queue and include a timing according to which different data transfer processes are carried out. According to the invention, this assignment is carried out by the forwarder device acting a scheduler. The goal of the scheduler is to balance processor loads and to prevent any process from monopolizing the processor or being starved for resources. Thus, the forwarder according to the invention has the double function as an entity for transmitting data between two networks, and simultaneously as an entity to manage the order of a data transfer to avoid bandwidth problems and data loss in case that a plurality of nodes send data packets to such an extent that the bandwidth capabilities of the network array may be temporarily insufficient.

It is a fundamental aspect of the invention that the forwarder node, in its function as a scheduling management entity, distinguishes between data to be transferred between nodes of two different networks on the one hand, and traffic generated due to data transfer within one of the networks on the other hand. Traffic between two different networks is also denoted as "multi-hop" traffic, whereas traffic within one and the same network is denoted as "single-hop" traffic. This distinction allows the forwarder to properly fulfil its function as a scheduling entity so that Quality of Service (QoS) requirements are securely fulfilled. The distinction between multi-hop traffic and single-hop traffic is essential for a reasonable planning of the data packets to be transferred.

As a solution for connecting two networks according to the invention, a dedicated device responsible for connecting both networks is used which simultaneously manages the data scheduling. This device, namely the forwarder (FHC), may relay (i.e. forward) packets from an AP/HC to a remote QSTA and vice versa. This relay process can be performed in a transparent way, that is, neither the AP/HC nor the QSTA require routing capabilities.

Many of the existing multi-hop ad-hoc networks forward packets in the time domain, using only one frequency channel. However, forwarding in the frequency domain, as performed by the invention, is preferable and increases the total capacity in each network (QBSS, Quality of Service basic service set). The invention preferably performs frequency forwarding using a single transceiver.

In other words, the invention provides a frequency forwarding mechanism with Quality of Service support. Particularly, the invention teaches the use of a device, namely the forwarder, which may be composed of a single transceiver, dedicated to schedule and perform forwarding of various packets between two networks operating on two different frequency channels. Thus, the total capacity in each network (QBSS) is increased.

When forwarding data packets on two different frequency channels, the forwarder does not receive/transmit packets simultaneously in both networks. Consequently, it first communicates with one QBSS, then switches the channel and later communicates with the other QBSS, and so on. Therefore, the forwarder is usually partly present in the first network (absent in the second network) and is partly present in the second network (and absent in the first network).

Thus, the network scenario of the invention is composed of devices in two networks (for instance comprising a plurality of QSTAs, "Quality of Service stations", and one AP, "Access Point"). The invention can be advantageously implemented in the frame of the IEEE 802.11e standard (as described in IEEE 802.11 WG, part 11: Wireless LAN Medium Access Control (MAC) and Physical Layer (PHY) specifications: Medium Access Control (MAC) Enhancements for Quality of Service (QoS), 802.11e/D5.0, Draft Supplement to IEEE 802.11 Standard, July 2003).

An important aspect of the invention can be seen in the fact that a scheduling mechanism is implemented in a forwarder to achieve QoS (Quality of Service).

Scheduling usually includes the following aspects: admission control, in which an available data transfer capacity is calculated. Further, the setup of the traffic stream is estimated, i.e. it is estimated if enough capacity is present to transmit a data packet according to a data transfer request. Thus, based on a comparison of the available capacity and of the required capacity, the request is accepted or denied. A further aspect of the scheduling management is the manner how to allocate traffic, namely a traffic policy according to which it is decided in which chronological order different packets are transmitted.

According to the scheduling management of the invention, a plurality of multi-hop traffic requests may be bundled together to minimize the number of switches between the two operations states of the forwarding device. Thus, the transmission properties of a system can be optimized.

The invention teaches a scheduling mechanism for QoS support in multi-hop radio networks. According to the invention, a forwarder is used incorporating a scheduling mechanism, preferably based on round-robin, to guarantee QoS of multi-hop traffic. According to this scheduling mechanism, traffic streams are negotiated. In the case of a so-called multi-hop-uplink request (i.e. a request from a slave, e.g. a QSTA, in one of the two networks to a master, e.g. an AP, in the other one of the two networks), it is checked if the forwarder has capacity available, and if this check is positive, the request will be forwarded to the master (AP), and the response of the master (AP) may be forwarded to the slave (remote QSTA). In the case of a so-called multi-hop-downlink request (i.e. a request from a master, e.g. an AP, in one of the two networks to a slave, e.g. a QSTA, in the other one of the two networks), the master (AP) sends a schedule request to the forwarder. If there is enough bandwidth to receive the TS (traffic stream), the forwarder sends a schedule request message to the slave (remote QSTA).

An admission control unit which also may be included in the scheduling mechanism may be adapted to enable the forwarder to admit a multi-hop stream if there is enough bandwidth. This may be based on the TXOP (transmission opportunities) duration of existing single-hop and multi-hop traffic, the absence time of the forwarder. For single-hop traffic, if it is possible to establish a direct-link between two remote QSTAs, the forwarder will try to fit the TXOP in the absence interval. Otherwise, the forwarder may allocate a stream based in the presence time.

The forwarder of the invention can be realized by a computer program, i.e. by software, or by using one or more special electronic optimization circuits, i.e. in hardware, or in hybrid form, i.e. by means of software components and hardware components.

Referring to the dependent claims, further preferred embodiments of the invention will be described in the following.

Next, preferred embodiments of the network array of the invention will described. These embodiments may also be applied for the forwarder device and the method of operating a forwarder device.

In the network array of the invention, the forwarder node may be adapted in such a manner that it functions as a slave in the first network and as a master in the second network. In other words, the first network can be adapted such that a communication hub (Access Point, AP) is provided which has the function of a master in a master-slave system. In an operation state in which the forwarder is present in this first network, it functions as a slave and is controlled by the hub as the master. In contrast to this, the forwarder may have the function of a master in the second network, i.e. it may control the remaining nodes of the second network.

However, the forwarder having included a scheduling management function may also be applied to a network architecture in which the forwarder acts as a master in each of the networks. According to such a network architecture, the scheduling mechanism of the invention has to be adapted correspondingly.

In the case of the network array of the invention, the first network may be adapted as a master-slave network, and the second network may be adapted as a master-slave network.

Particularly, the first network may be adapted as an infrastructure network, and the second network may be adapted as an ad-hoc network. An infrastructure network may have a communication hub as the master of such an infrastructure network, whereas an ad-hoc network may be formed spontaneously and does not have a central hub for distributing data and connecting different nodes. In an ad-hoc node, a plurality of nodes may communicate with each other.

The plurality of first nodes may include a communication hub (Access Point) which may function as a master in the first network.

The plurality of first nodes may include at least one node which functions as a further slave in the first network (apart from forwarder device in an embodiment in which the forwarder device acts as a slave in the first network). In other words, together with the forwarder acting as a slave in the first network, a further slave node may be provided in the master slave architecture of the first network.

The forwarder node may be adapted to function as a Hybrid Coordinator in the second network. A Hybrid Coordinator (HC) may fulfil the function of a central coordinator for other stations. Such a Hybrid Coordinator may have implemented at least the following functions: beacon generation, traffic negotiation of traffic requests, polling of stations and scheduling the local traffic in the second (QBSS) network.

The forwarder node may be adapted to switch between a first operation state in which the forwarder node is communicatively coupled with the first network and is free of a communication with the second network, and a second operation state in which the forwarder node is communicatively coupled with the second network and is free of a communication with the first network. In other words, the network array of the invention has a forwarder which can switch or can be switched between a first operation state in which it communicatively interacts with the nodes of the first network using a first operation frequency, and a second operation state in which no communication is possible with the first network, but in which a communication is enabled with the nodes of the second network, via a second operation frequency. Thus, the forwarder may be active for a communication with the first network and simultaneously inactive for a communication with the second network, or may be inactive for a communication with the first network and simultaneously active for a communication with the second network. The switching between the two communication modes can be synchronized with a switching between the two operation frequencies, i.e. the forwarder node can be switched between a first mode in which it communicates with the first network and in which it works on the first operation frequency, and a second mode in which it communicates with the second network and in which it works on the second operation frequency.

The forwarder node may be realized as a single transceiver.

The forwarder node may be adapted to communicate with the first network and with the second network according to the IEEE 802.11e standard. The IEEE 802.11e standard leaves the design of the schedule function up to the vendor. Thus, there is a large degree of freedom to adapt the scheduling management function of the forwarder to the desired conditions.

A part of the plurality of first nodes and/or of the plurality of second nodes may be realized as a computer device, e.g. as a desktop computer, a laptop computer, a PDA ("personal digital assistant") or the like. However, each of the nodes may also be realized as a cellular phone or the like.

The forwarder node may be adapted to forward a data packet from the first network to the second network or to forward a data packet from the second network to the first network.

Particularly, the forwarder node may be adapted, prior to forwarding a data packet from the first network to the second network or to forwarding a data packet from the second network of the first network, to estimate a bandwidth necessary for transmitting the data packet. This function in the frame of the scheduling management calculates the necessary bandwidth capability for transmitting a particular data packet. This helps to manage the transmission of data packets along a communication path having a pre-given bandwidth capability.

The forwarder node may be adapted, prior to forwarding a plurality of data packets from the first network to the second network or to forwarding a plurality of data packets from the second network to the first network, to determine a chronological order of transmission of the plurality of data packets based on a predetermined traffic policy. Thus, one or more rules may be predefined as a basis for chronologically arranging various data packets. For example, data packets having a higher degree of priority may be transmitted earlier than a data packet having a lower degree of priority, even in a scenario in which a request for transmitting the latter data packet arrives at an earlier time than a request for transmitting the former data packet. Alternatively, the traffic policy may follow a simple "first come, first served" principle.

At least one of the first network and the second network may be a wireless network. Particularly, the forwarder may be adapted to communicate with at least one of the two networks in a wireless manner, e.g. by exchanging electromagnetic signals.

The data transmission scheduling management function may be adapted to distinguish between multi-hop transmission data and single-hop transmission data.

"Multi-hop" transmission data are data which are to be transferred from an initial node to a final node via at least one intermediate node provided between the initial node and the final node. In contrast to this, a single-hop traffic data packet is directly transmitted from an initial node to a final node without passing one or more intermediate nodes.

The data transmission scheduling management function may be adapted to distinguish between multi-hop transmission data to be transmitted from a communication hub of the first network to one of the plurality of the second nodes of the second network, on the one hand, and multi-hop transmission data to be transmitted from one of the plurality of second nodes of the second network to a communication hub of the first network, on the other hand. For these two communication paths, different frame conditions may be taken into account to further refine the scheduling function to further improve the quality of the data transmission architecture.

The data transmission scheduling management function may be realized as a round-robin scheduling scheme. "Round-robin" scheduling is a scheduling discipline which assigns time slices, "time quanta", to each process in equal portions and order, without any priorities between the processes. All processes will thus have the same priority.

The forwarder device may be adapted such that the data transmission scheduling management function aggregates the streams related to multi-hop traffic.

Beyond this, the forwarder device may be adapted such that single-hop traffic in the second network is allocated in direct links during an absence of the forwarder device in the second network.

Next, preferred embodiments of the method of operating a forwarder device of the invention will described. These embodiments may also be applied for the network array and for the forwarder device.

According to a preferred embodiment of the method, multi-hop-uplink requests are negotiated including the steps of checking, using the second operation frequency, at least one traffic request from at least one of the second nodes using an Admission Control Unit provided in the forwarder device. A traffic request is refused, if it is determined that no sufficient capacity is available in the forwarder device. In case that a traffic request is not refused, it is waited to switch from the second operation frequency to the first operation frequency and it is forwarded the request to a communication hub forming one of the first nodes of the first network using the first operation frequency. Further, a response from the communication hub is checked in the Admission Control Unit in the forwarder device, and it is waited to switch from the first operation frequency to the second operation frequency, and the response is forwarded to the at least one of the second nodes.

According to another preferred embodiment of the method, multi-hop-downlink requests are negotiated including the steps of responding to at least one Schedule request from a communication hub forming one of the first nodes by sending at least one Traffic Stream Request using the first operation frequency, and waiting for a reception of a traffic stream request from the communication hub using the first operation frequency and checking a capacity using an Admission Control Unit in the forwarder device. The traffic stream is deleted using the first operation frequency, if it is determined that there is no sufficient capacity available. In case that the traffic stream is not deleted, it is waited to switch from the first operation frequency to the second operation frequency, and a schedule request is sent to one of the second nodes using the second operation frequency.

The aspects defined above and further aspects of the invention are apparent from the examples of embodiments to be detailed hereinafter and are explained with reference to these examples of embodiment.

The invention will be described in more detail hereinafter with reference to examples of embodiment but to which the invention is not limited.

The illustration in the drawing in schematically. In different drawings, similar or identical elements are provided with the same reference signs.

In the following, referring to FIG. 1, a network array 100 according to a first embodiment of the invention will be described in detail.

Figure 1:
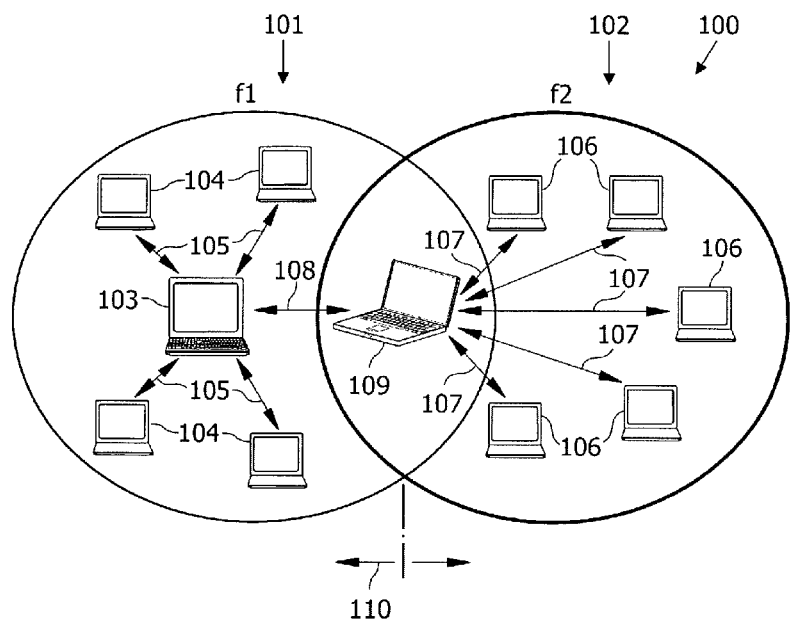
FIG. 1 shows a schematic view of a network array according to a preferred embodiment of the invention.

FIG. 1 shows a network array 100 comprising a first QBSS network 101 having a plurality of first QSTA terminals 104. Further, the network array 100 comprises a second QBSS network 102 having a plurality of second QSTA terminals 106. Beyond this, a forwarding device 109 is implemented as an interface between the two QBSS networks 101, 102 being realized as a single transceiver. The forwarder device 109 constitutes one of the nodes of the first QBSS network 101 and constitutes one of the nodes of the second QBSS network 102 to form a communication interface between the first QBSS network 101 and the second QBSS network 102 in such a manner that the forwarder device 109 functions as a slave in the first network 101 and functions as a master in the second QBSS network 102. The forwarder device 109 is further adapted to communicate with the first QBSS network 101 using a first operation frequency f1 and to communicate with the second QBSS network 102 using a second operation frequency f2 which is different from the first operation frequency f1.

As indicated by a switch 110, the forwarding device 109 can be switched between a first operation mode in which it works on the first operation frequency f1 to communicate with the nodes 103, 104 of the first QBSS network 101 and a second operation mode in which the forwarding device 109 communicates with the nodes 106 of the second QBSS network 102 using the second operation frequency f2. "f1" and "f2" each denote either a particular frequency value or alternatively a particular frequency band.

As can be further seen from FIG. 1, there is provided a first communication path 105 for a wireless communication between the hub 103 and any of the first QSTA terminals 104. Further, a second communication path 107 is provided for a communication between the forwarding device 109 on the one hand and any of the second QSTA terminals 106 of the second QBSS network 102 on the other hand. Thus, the forwarding device 109 acts as a master for controlling the second QSTA terminals 106 in the second operation mode, in which a communication between the forwarding device 109 and the nodes 106 of the second QBSS network 102 is enabled.

Further, a third communication path 108 may be established for a communication between the forwarding device 109 on the one hand and the hub 103 on the other hand. In this first operation mode, according to which data signals may be transmitted between the forwarding device 109 and the hub 103 on the first operation frequency f1, the forwarding device 109 acts as a slave in the first QBSS network 101 and is controlled by the hub 103 which may transmit signals forwarded from the forwarding device 109 to any of the first QSTA terminals 104, or vice versa.

Thus, FIG. 1 shows the connection of two QBSS networks 101, 102 by the use of a forwarder (FHC) 109.

When forwarding in frequency with a single transceiver, the FHC 109 cannot receive/transmit packets simultaneously in both QBSS networks 101, 102. In contrast to this, it needs first to communicate with one QBSS network (e.g. with the first QBSS network 101), to switch the channel (i.e. to change the operation frequency from f1 to f2) and to communicate the with the other QBSS network (e.g. with the second QBSS network 102), and so on.

The forwarder node 109 has an implemented data transmissions scheduling management function based on a round-robin scheduling scheme capable of controlling and regulating the data signal transfer between nodes 104, 103 of the first QBSS network 101 and nodes 106 of the second QBSS network 102. The data transmission scheduling management function implemented in the forwarding node 109 is capable of distinguishing between data to be transmitted between the first QBSS network 101 and the second QBSS network 102, and data to be transmitted within the first QBSS network 101 or within the second QBSS network 102.

The forwarding device 109 can be operated in a first operation state in which it forms an active node of the first QBSS network 101, and a second operation state in which it forms a master in the second QBSS network 102. This switching of the forwarding device 109 is illustrated schematically by the switch 110. The forwarding node 109 is adapted to communicate with the first QBSS network 101 and with the second QBSS network 102 according to the IEEE 802.11e standard. The forwarder node 109 is adapted to forward a data packet from the first QBSS network 101 to the second QBSS network 102 by using the communication paths 105, 107, 108 or to forward a data packet from the second network 102 to the first QBSS network 101.

In order to communicate the stations 106 in the remote BSS (second QBSS network 102) with the AP/HP 103, a specific device denoted as forwarding device (FHC) 109 is provided. This forwarding device 109 uses a single transceiver to forward packets in the frequency domain. In order to guarantee Quality of Service (QoS), the FHC 109 behaves as a station (QSTA) in the subnet 101 controlled by the AP 103 and takes the role of a Hybrid Coordinator (HC) in the remote subnet 102. However, the FHC 109 has implemented the functions related to a Hybrid Coordinator (HC), such as traffic scheduling.

In the following, traffic scheduling in a WLAN (wireless local-area network) is described in more detail.

In order to guarantee Quality of Service in a WLAN, it is necessary to implement a traffic scheduling function responsible for granting/denying a traffic request ("Admission Control") and for allocating traffic according to a Traffic policy.

The IEEE 802.11e standard is a standard that leaves a design of the schedule function up to the vendor. The normative text does state that the scheduler should offer transmission opportunities (TXOPs) based on the previously negotiated traffic specification (TSPEC). During the negotiation process, the Quality of Service requirements of a requesting TSPEC (AddTS request) are defined by mandatory parameters, which are Mean Data Rate, Nominal MSDU ("MAC service data unit") Size and at least one of the Maximum Service Interval and Delay Bound. The schedule function will use these parameters to calculate the bandwidth needed (TXOP duration) by the new request and to check if there is a bandwidth available. If the TSPEC is admitted, the HC shall respond with an AddTS Response message, including the parameters Mean Data Rate, Nominal MSDU size and Maximum Service Interval.

One simple scheduling mechanism proposed in the standard is round-robin (RR) scheduling. Round-robin is used in polling based protocols (see M. Shreedhar, G. Varghese, "Efficient fair queuing using deficit round robin", Proc. ACM SIGCOMM 1995, Cambridge, Mass., August 1995; and Ravindra S. Ranasinghe, Lachlan L. H. Andrew, David A. Hayes and David Everitt "Scheduling disciplines for multi-media WLANs: Embedded round robin and wireless dual queue", IEEE Int. Conf. Commun. (ICC), Helsinki, Finland, June 2001). Round-Robin scheduling polls stations cyclically regardless of the state of their queues. Based on round-robin, two simple algorithms for Admission Control Unit (ACU) and traffic policy are described as follows.

In the following, the function of an Admission Control Unit (ACU) will be described.

Since the Scheduler of polls the stations cyclically, when a new traffic stream (TS) request arrives, the Admission Control Unit has to calculate the new polling period (Scheduled Service Interval, SI) and the TXOP duration for the given SI.

The calculation of the Schedule Service Interval as shown in equation (1) and in equation (2). Firstly, the Scheduler calculates the minimum of all Maximum Service Intervals for all admitted streams. This minimum is denoted as m. Secondly, the Scheduler chooses a number lower than m that is a submultiple of the beacon interval.

$$m=\min(\max SI_i) \ i \in \text{Admitted TSPECs} \qquad (1)$$

$$SI=T/\lceil T/m \rceil \ T=TBTT \qquad (2)$$

Figure 2:
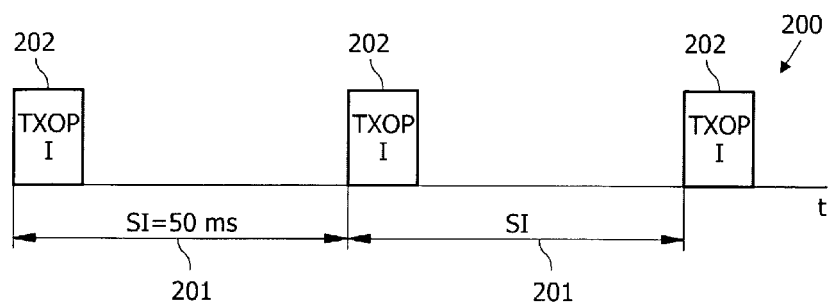
FIG. 2 to FIG. 5 show time schedules for data streams according to the schedule management of the invention.

The value SI is the Scheduled Service Interval for all non-AP QSTAs with admitted streams, as shown in FIG. 2.

FIG. 2 shows a time schedule 200 for a stream from one of the QSTA nodes of FIG. 1. The time (t) dependence of the transmitted signals is shown in FIG. 2. FIG. 2 indicates a Service Interval (SI) 201 having a time length of 50 ms, wherein a transmission opportunity packet (TXOP) 202 is shown in each Service Interval 201.

For the calculation of the TXOP 202 duration of an admitted stream, the Scheduler uses the TSPEC parameters Mean Data Rate (ρ) and Nominal MSDU size (L) from the negotiated TSPEC and the Scheduled Service Interval 201 as calculated above. The Physical Transmission Rate ($R_i$) is the minimum PHY Rate negotiated in the TSPEC. If the Minimum PHY Rate is not committed in the AddTS response, the Scheduler can use observed PHY Rate as R.

The TXOP 202 duration is calculated as follows: first, the Scheduler calculates the number of MSDUs to arrive at the Mean Data Rate during the SI 201:

$$N_i = \left\lceil \frac{SI \times \rho_i}{L_i} \right\rceil \qquad (3)$$

Then, the scheduler calculates the TXOP 202 duration as the maximum of the time to transmit $N_i$ frames at a rate $R_i$, and the time to transmit one maximum size MSDU at $R_i$ (plus overhead):

$$\text{TXOP}_i = \max(N_i \times T_{data}^m(L_i) + O, T_{data}^m(M) + O) \qquad (4)$$

In equation (4), M is the Maximum allowable Size of MSDU, i.e. 2304 bytes. The Overhead of the MAC layer (O) in time includes interframe spaces, ACKs and CF-Polls. $T_{data}^m(L_i)$ is the time needed to transmit a MPDU with $L_i$-byte long payload at PHY-mode m. Considering the OFDM modulation:

$$T_{data}^m(L_i) = t_{PLCP\ Preamble} + t_{PLPCHHeader} + \left\lceil \frac{30.75 + L_i}{BpS(m)} \right\rceil T_{SIGNAL} \qquad (5)$$

Where $t_{PLCP\ Preamble}$ and $t_{PLPC\ Hheader}$ are the duration of the PLCP preamble and PLCP header (60 ms and 4 ms, respectively). $T_{SIGNAL}$ is the duration of the OFDM symbol (4 μS) and BpS(m) the amount of bytes per OFDM symbol.

The MAC overhead without using the Block Acknowledge (BA) function is as follows:

$$O = T_{CF\text{-}Poll} + N_i \times T_{ack} + N_i \times 2 \times SIFS + PIFS \quad (6)$$

And for the transmission of only one MSDU of maximum size:

$$O = T_{CF\text{-}Poll} + T_{ack} + 2 \times SIFS + PIFS \quad (7)$$

Once the Scheduled Service Interval (SI) 201 and the TXOP 202 duration are calculated based on the equations (2) and (4), the ACU has to check if there is still bandwidth in the superframe to allocate the new TXOP:

$$\frac{TXOP_{k+1}}{SI} + \sum_{i=1}^{k} \frac{TXOP_i}{SI} \le \frac{T - T_{beacon} - T_{CP}}{T} \quad (8)$$

where k is the number of already admitted streams and k+1 is used to indicate the requesting stream. T denotes a beacon interval and $T_{CP}$ is the time used for contention traffic.

In the following, the Traffic policy in the frame of the scheduling management will be described.

The allocation of TXOPs is based on the TXOP duration and the Scheduled Service Interval (SI) calculations given above, particularly equations (2) and (4).

Regarding the TXOP polling order, once a TS is accepted, the TXOP is polled just after the previously accepted TXOPs, following a "first come, first served" policy.

An example is shown in FIG. 2, where a stream from a QSTAi (number i) is admitted. The beacon interval is 100 ms, and the Maximum Service Interval for the stream is 60 ms. The Scheduler calculates a Scheduled Service Interval (SI) 201 equal to 50 ms since, as previously explained, it is the closest submultiple to the beacon interval.

In the following, referring to FIG. 3, a time schedule 300 for streams from QSTAs i, j, k will be explained.

In the time schedule 300, in addition to the Service Interval 201 and the first transmission opportunity packet 202, a second transmission opportunity packet 301 and a third transmission opportunity packet 203 are shown for each Service Interval 201.

Figure 3:
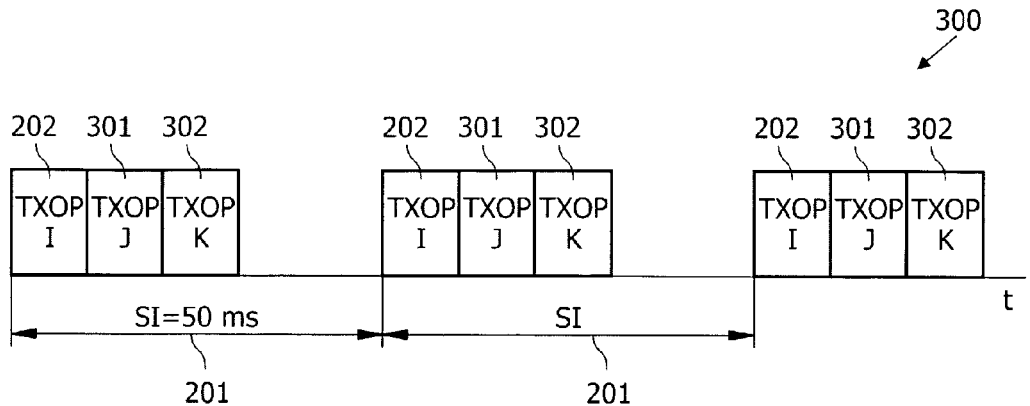

As shown in FIG. 3, each new TXOP 301, 302 is allocated behind the previous one 202. If a new stream is admitted with a Maximum Service Interval smaller than the current SI 201, the Scheduler needs to change the current SI to a smaller number than the Maximum Service Interval of the newly admitted stream. Therefore, the TXOP duration for the current admitted streams also needs to be recalculated with the new SI.

Figure 4:
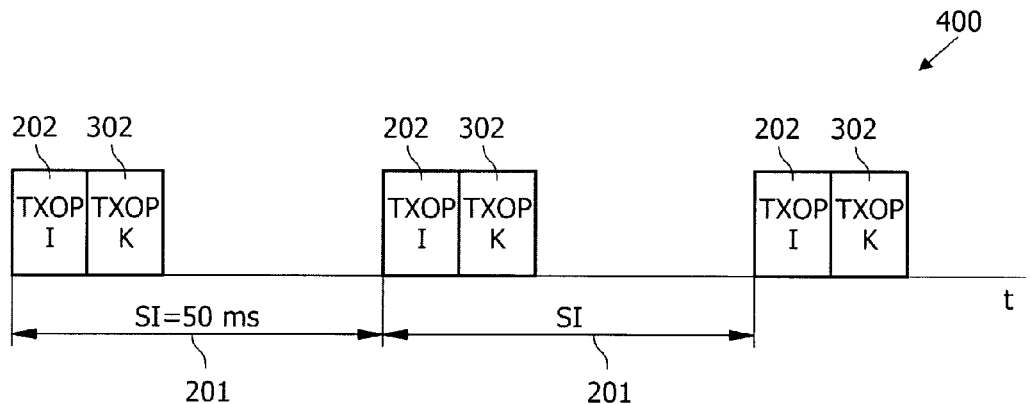

In the following, a time schedule 400 will be explained referring to FIG. 4, showing a reallocation of TXOPs when a stream is dropped.

If a stream is dropped, the Scheduler will move the TXOPs for the QSTAs following the QSTA dropped to reuse the bandwidth available. An example is shown in FIG. 4, when stream for QSTAj is removed. This requires the announcement of a new schedule to all QSTAs with scheduled TXOPs after j (QSTA k in the example).

In the following, the use of the forwarding device 109 to guarantee Quality of Service of multi-hop traffic incorporating a scheduling management function (for instance based on a round-robin mechanism) will be described in more detail.

During its presence in the second QBSS network 102, the forwarder 109 will allocate the TXOPs as described above. Moreover, it will take advantage of the support of aggregation of traffic given in the standard. For all the requests of multi-hop traffic, the FHC 109 will set the aggregation bit. This way, the AP/HC 103 will group all the stream of multi-hop traffic, as can be seen in FIG. 5.

Figure 5:
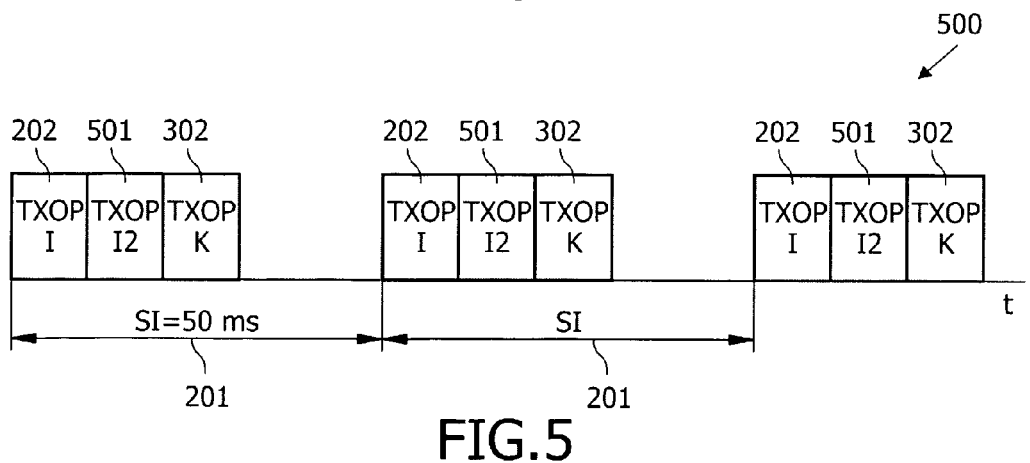

FIG. 5 shows a time schedule 500 in which a new stream 12 is scheduled after I. In other words, according to the time schedule 500, a forth transmission opportunity packet 501 is sandwiched between the first transmission opportunity packet 202 and the third transmission opportunity packet 302. As explained above, the forwarder 109 forwards packets in the frequency domain. Therefore, the forwarder 109 will switch from one channel to another. The capacity available in the second QBSS network 102 is then limited by the presence time in the second QBSS network 102. Moreover, the scheduling function has to distinguish between the traffic to forward (multi-hop) and the local (single-hop) traffic, since the first needs to be transmitted two times (namely in the first QBSS network 101 and in the second QBSS network 102) and the second only once.

Figure 8:
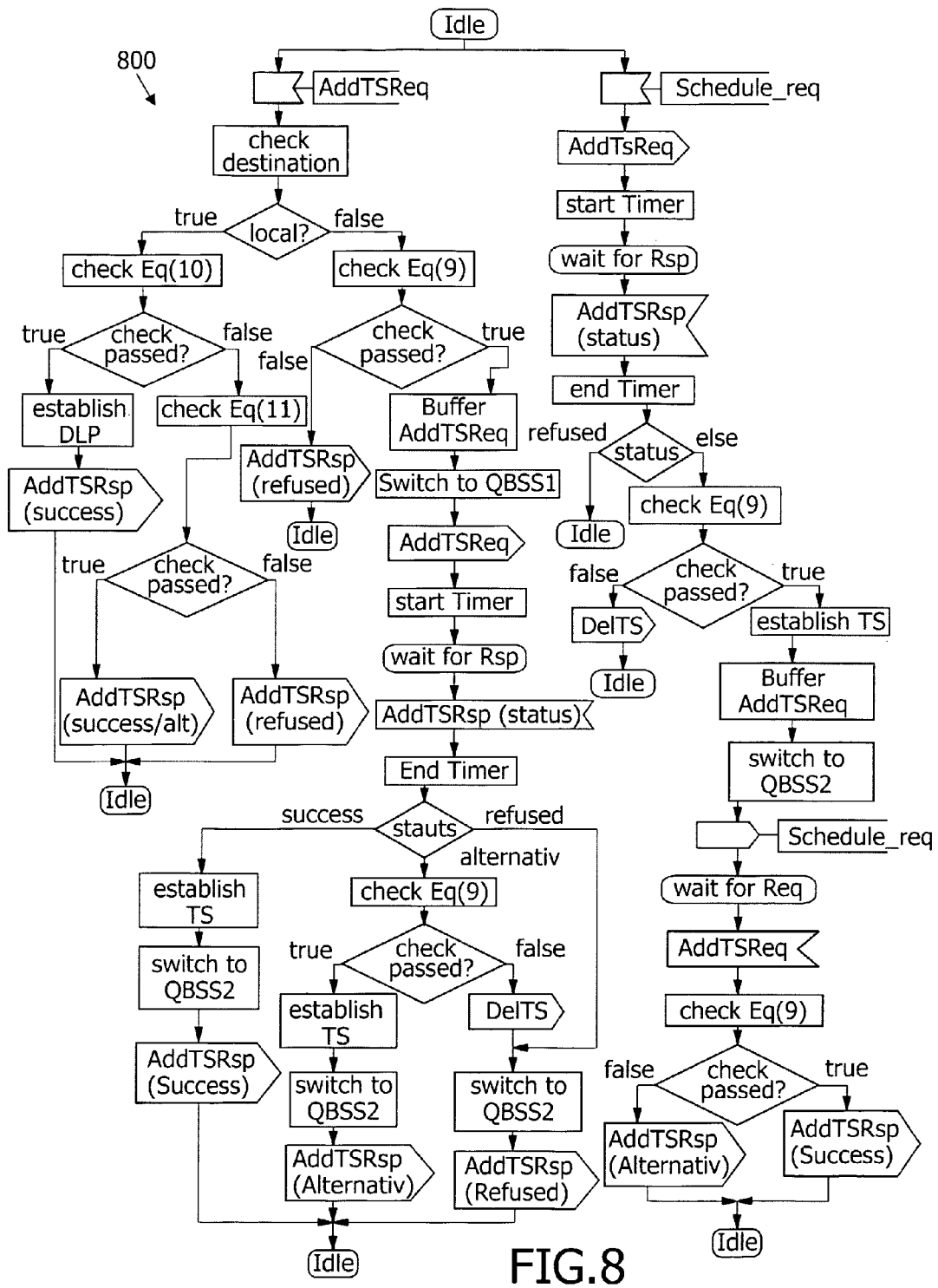
FIG. 8 shows an algorithm for the negotiation of traffic streams implemented in SDL.

Taking this into account, according to the invention a new method is proposed for the negotiation of traffic streams and for the Admission Control Unit to be implemented in the forwarder 109. This method is described in the following in more detail. The implementation of this method in the FHC 109 using SDL language is illustrated in FIG. 8. In other words, FIG. 8 shows a communication protocol 800 in SDL ("Specification and Description Language").

In the following, the negotiation of traffic streams according to this method will be described.

Since the multi-hop streams need to go through the forwarder 109, the setup protocol has to distinguish between so-called multi-hop-downlink requests and so-called multi-hop-uplink requests. A multi-hop-downlink request follows a communication path from the AP 103 to any of the stations 106 in the second QBSS network 102, in other words following the communication paths 108 and subsequently 107. A multi-hop-uplink request introduces a communication path from one of the QSTAs 106 in the second QBSS network 102 to the AP 103, introducing a communication path 107 and subsequently a communication path 108.

In the following, the setup of multi-hop-uplink requests will be described in more detail.

In the uplink case, a TS from a remote QSTA 106 will be checked first by the Admission Control Unit in the forwarder 109, since the capacity of the remote cell is the bottleneck for the multi-hop traffic. If there is no capacity available, the FHC 109 will just deny the request. Otherwise, the request will be forwarded to the HC 103, and the response of the HC 103 will be forwarded to the remote QSTA 106.

Figure 6:
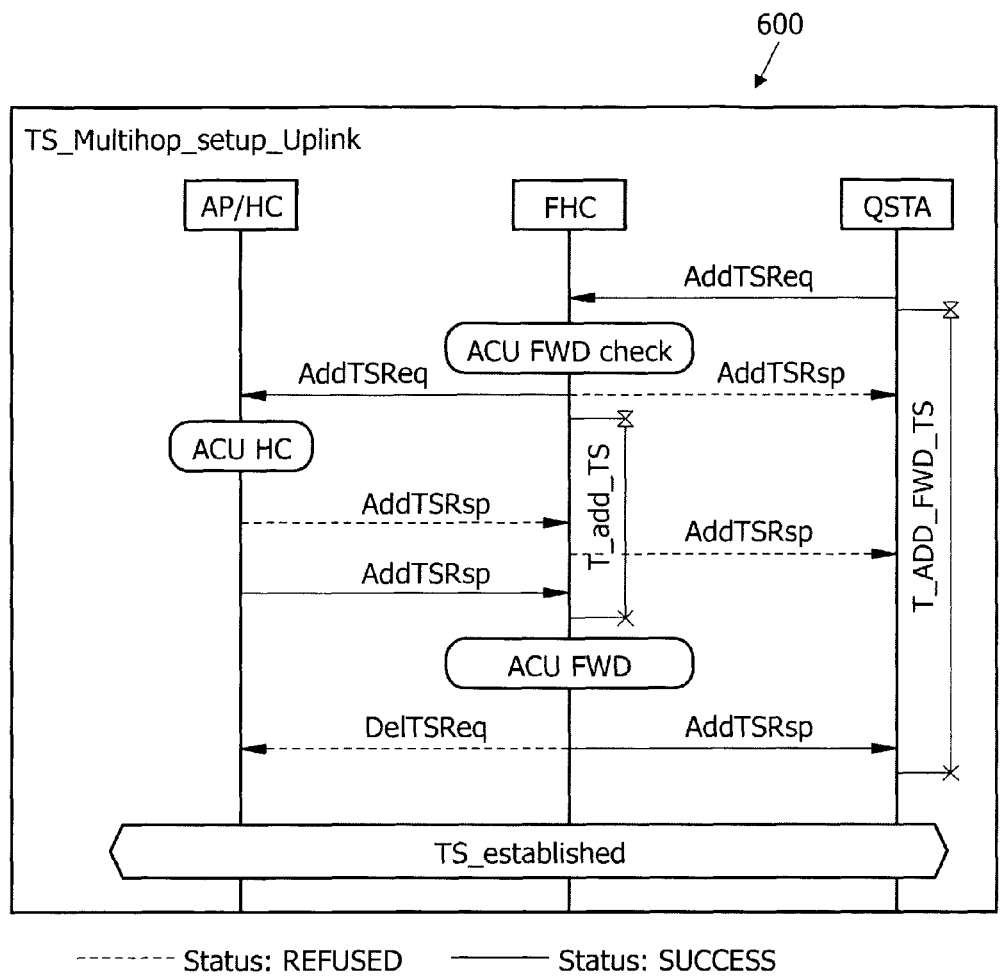
FIG. 6 shows a setup protocol for multi-hop-uplink traffic according to the scheduling management of the invention.

FIG. 6 shows the TS setup protocol 600 for a scenario in which multi-hop-uplink-traffic is scheduled.

According to the multi-hop-uplink setup protocol 600, the FHC 109 will first check first (according to equation (9)) if there is enough capacity to admit the requested TS parameters. In case the check succeeds, the request frame will be stored in the buffer, waiting for the frequency switch. After the frequency switch is completed, the frame will be taken from the buffer and the FHC 109 will try, during the contention period, to transmit the request to the AP/HC 103, with the Traffic Aggregation bit set. Once received, the AP/HC 103 will decide whether to admit the TSPEC, as specified in equation (8), admit the TSPEC with a counter proposal or refuse the TSPEC, generating an MLME-AddTS response primitive containing the TSPEC and a status value: SUCCESS, ALTERNATIVE or REFUSED.

The FHC 109 MAC will receive this management frame and will cancel its AddTS timer. It will check the status of the TSPEC. In the REFUSED Status case, the FHC 109 will directly refuse the stream without any further calculation. Then, it will switch to the second QBSS network 102 and will send an AddTSRsp message with REFUSED status.

In the ALTERNATIVE case, the ACU of the FHC 109 will check again if with there is enough capacity with the new parameters. If there is not enough capacity, the FHC 109 will send a DelTSReq message to the AP/HC 103 before switching. Then, it will send an AddTSRsp message to the QSTA 106 with ALTERNATIVE status.

In the SUCCESS Status case, the FHC 109 will switch to the second QBSS network 102 without any calculation and forward the AddTSRsp message.

Figure 7:
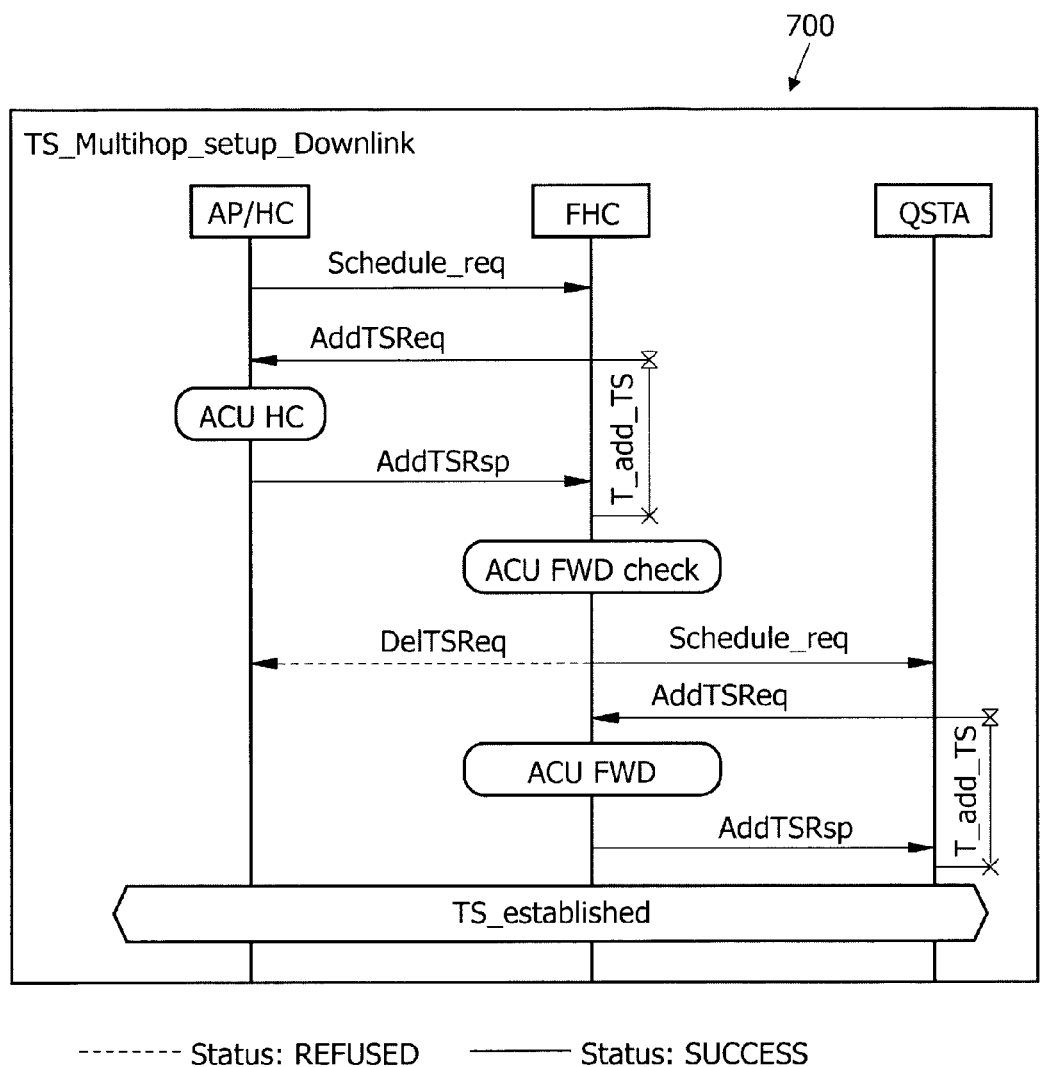
FIG. 7 shows a setup protocol for multi-hop-downlink traffic according to the scheduling management of the invention.

In the following, referring to FIG. 7 showing a multi-hop-downlink setup protocol 700, the setup of multi-hop-downlink requests will be described in more detail.

The 802.11e standard defines that each traffic stream should be requested by the non-AP QSTAs. Then, in this case, the AP/HC 103 will send a Schedule Request to the FHC 109. The FHC 109, without knowing the traffic specifications, cannot calculate if there is capacity available or not. Then, immediately after, the FHC 109 transmits an AddTS request with Traffic Aggregation bit set to the AP/HC 103 in the corresponding Quality of Service Management Action frame or (re)association request frame, and will start a T_ADD_TS timer of duration dot11AddTSResponseTimeout.

The HC/AP 103 MAC will receive this management frame and will transmit an AddTS response in the corresponding Quality of Service Management Action frame or (re)association response containing this TSPEC and status.

Once the FHC 109 receives this management frame, it will cancel its AddTS timer. Given the TSPEC, the Admission Control Unit of the forwarder 109 will calculate if there is enough bandwidth to receive this TS and forward it to the second QBSS network 102, see below. In the positive case, the FHC 109 will switch to the second QBSS network 102 and will send a ScheduleReq message to the destination QSTA 106. Otherwise, it will send a DELTSReq to the AP/HC 103.

In the following, the function of the Admission Control Unit for use with the forwarder 109 will be described in more detail.

Usually, the forwarder 109 is not present the same amount of time in both QBSS networks 101, 102. Then, the admission control algorithm has to distinguish between multi-hop traffic and single hub (local) traffic.

Since the same values of SI 201 and $TXOP_k$ 202, 301, 302, 501 are usually used in both QBSS networks 201, 202, the Scheduler implemented in the forwarding device 109 will assume the value given by the AP/HC 103. In case of local traffic, the scheduler of the forwarding device 109 calculates the TXOP 202, 301, 302, 501 as given in equation (4).

In order to admit a multi-hop stream, the following inequality (9) shall be satisfied:

$$2\left(TXOP_{k+1}^{MH} + \sum_{i=1}^{k} TXOP_i^{MH}\right) + \sum_{i=1}^{j} TXOP_i^{SH} + 2T_{FS} \leq \quad (9)$$

$$T_2 - 2T_{beacon} - T_{CP} - T_{CP2}$$

In inequality (9), k is the number of existing multi-hop streams (MH) and k+1 is the index of the new requested multi-hop stream. j is the number of single-hop (SH) traffic streams data served with the forwarder 109 is present in the second QBSS network 102. $T_{FS}$ is the time needed to switch between frequencies. $T_2$ indicates the beacon interval in the remote QBSS 102 and $T_{CP2}$ is the time used for contention traffic. Different to the capacity in the AP/HC 103, the FHC 109 has to take into account the absence time, which includes the reception of $T_{beacon}$ and $T_{CP}$ in the first QBSS network 101, and the transmission of multi-hop traffic in the first QBSS network 101. The factor two refers to the fact that the forwarder traffic is transmitted in both QBSSs 101, 102.

In case the requested stream is for single-hop traffic, the ACU can check if it can be allocated during the absence interval using the Direct Link Protocol (DLP).

First the forwarder 109 will then compare the absence interval with the requested TXOP 201, in case it is not already used, the ACU will try to fit the TXOP in the $T_{abs}$ and establish a direct link.

$$TXOP_{j+1}^{SH} \leq T_{beacon} + \sum_{i=1}^{k} TXOP_i^{MH} + 2T_{FS} \quad (10)$$

In case that inequality (10) is not accomplished, or it was not possible to establish a direct link (e.g. the two QSTAs were not in the range of each other), then ACU will try to allocate the stream in the presence time. In this case, the stream is admitted when the following inequality (11) is satisfied:

$$TXOP_{j+1}^{SH} + \sum_{i=1}^{j} TXOP_i^{SH} + 2\left(T_{FS} + \sum_{i=1}^{k} TXOP_i^{MH}\right) \leq \quad (11)$$

$$T_2 - 2T_{beacon} - T_{CP} - T_{CP2}$$

where j is the number of existing streams for single-hop traffic and j+1 is the index of the new requested stream. k is the number of existing multi-hop streams, $T_2$ indicates the beacon interval in the remote cluster and $T_{CP2}$ is the time used for contention traffic.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

The invention claimed is:

1. A network array comprising:
    a first network having a plurality of first nodes, wherein the first network is an infrastructure network;
    a second network having a plurality of second nodes, wherein the second network is an ad-hoc network; and
    a forwarder node configured to operate as a slave in the first network and as a master in the second network;
    wherein the forwarder node constitutes one of the first nodes and constitutes one of the second nodes to form a communication interface between the first network and the second network;
    wherein the forwarder node is configured to distinguish between data for transmission between the first and second networks and data for transmission within the first network and data for transmission within the second network;
    wherein the forwarder node comprises an implemented data transmission scheduling management function for controlling and regulating data to be transmitted between the first network and the second network and data to be transmitted within the first network or within the second network; and wherein the forwarder node communicates with the first network using a first operation frequency and communicates with the second network using a second operation frequency which is different from the first operation frequency.

2. The network array according to claim 1, wherein the plurality of first nodes include a communication hub which functions as a master in the first network.

3. The network array according to claim 1, wherein the plurality of first nodes include at least one node which functions as a further slave in the first network.

4. The network array according to claim 1, wherein the forwarder node is a Hybrid Coordinator in the second network.

5. The network array according to claim 1, wherein the forwarder node switches between a first operation state in which the forwarder node is communicatively coupled with the first network and is free of a communication with the second network, and a second operation state in which the forwarder node is communicatively coupled with the second network and is free of a communication with the first network.

6. The network array according to claim 1, wherein the forwarder node is realized as a single transceiver.

7. The network array according to claim 1, wherein the forwarder node communicates with the first network and with the second network according to the IEEE 802.11e standard.

8. The network array according to claim 1, wherein at least a part of the plurality of first nodes and/or of the plurality of second nodes is realized as a computer device.

9. The network array according to claim 1, wherein the forwarder node forwards a data packet from the first network to the second network or forwards a data packet from the second network to the first network.

10. The network array according to claim 9, wherein the forwarder node, prior to forwarding a data packet from the first network to the second network or to forwarding a data packet from the second network to the first network, estimates a bandwidth necessary for transmitting the data packet.

11. The network array according to claim 9, wherein the forwarder node, prior to forwarding a data packet from the first network to the second network or to forwarding a data packet from the second network to the first network, accepts or denies a data packet transmission request based on an estimated bandwidth necessary for transmitting the data packet.

12. The network array according to claim 9, wherein the forwarder node, prior to forwarding a plurality of data packets from the first network to the second network or to forwarding a plurality of data packets from the second network to the first network, determines a chronological order of transmission of the plurality of data packets based on a predetermined traffic policy.

13. The network array according to claim 1, wherein at least one of the first network and the second network is a wireless network.

14. The network array according to claim 1, wherein the data transmission scheduling management function distinguishes between multi-hop transmission data and single-hop transmission data.

15. The network array according to claim 1, wherein the data transmission scheduling management function distinguishes between multi-hop transmission data to be transmitted from a communication hub of the first network to one of the plurality of second nodes of the second network on the one hand and multi-hop transmission data to be transmitted from one of the plurality of second nodes of the second network to a communication hub of the first network on the other hand.

16. The network array according to claim 1, wherein the data transmission scheduling management function is realized as a round-robin scheduling scheme.

17. A forwarder device for forming a communication interface between a first network and a second network of a network array and for managing data transmission scheduling, comprising:

one of a plurality of first nodes of a first network, wherein the first network is an infrastructure network; and one of a plurality of second nodes of a second network to form a communication interface between the first network and the second network, wherein the second network is an ad-hoc network;

wherein the forwarder node is configured to operate as a slave in the first network and as a master in the second network, and wherein the forwarder device is configured for:

distinguishing between data for transmission between the first and second networks and data for transmission within the first network and data for transmission within the second network;

having an implemented data transmission scheduling management function for controlling and regulating data to be transmitted between the first network and the second network and data to be transmitted within the first network or within the second network; and communicating with the first network using a first operation frequency and communicating with the second network using a second operation frequency which is different from the first operation frequency.

18. The forwarder device according to claim 17, functioning as a Hybrid Coordinator in the second network.

19. The forwarder device according to claim 17, switching between a first operation state in which it is communicatively coupled with the first network and is free of a communication with the second network, and a second operation state in which it is communicatively coupled with the second network and is free of a communication with the first network.

20. The forwarder device according to claim 17, communicating with the first network and with the second network according to the IEEE 802.11e standard.

21. The forwarder device according to claim 17, forwarding a data packet from the first network to the second network or forwarding a data packet from the second network to the first network.

22. The forwarder device according to claim 21, prior to forwarding a data packet from the first network to the second network or to forwarding a data packet from the second network to the first network, estimating a bandwidth necessary for transmitting the data packet.

23. The forwarder device according to claim 21, prior to forwarding a data packet from the first network to the second network or to forwarding a data packet from the second network to the first network, accepting or denying a data packet transmission request based on an estimated bandwidth necessary for transmitting the data packet.

24. The forwarder device according to claim 21, wherein the forwarder node, prior to forwarding a plurality of data packets from the first network to the second network or to forwarding a plurality of data packets from the second network to the first network, determines a chronological order of transmission of the plurality of data packets based on a predetermined traffic policy.

25. The forwarder device according to claim 17, communicating wirelessly with the first network and/or with the second network.

26. The forwarder device according to claim 17, wherein the data transmission scheduling management function distinguishes between multi-hop transmission data and single-hop transmission data.

27. The forwarder device according to claim 17, wherein the data transmission scheduling management function distinguishes between multi-hop transmission data to be transmitted from a communication hub of the first network to one of the plurality of second nodes of the second network on the one hand and multi-hop transmission data to be transmitted from one of the plurality of second nodes of the second network to a communication hub of the first network on the other hand.

28. The forwarder device according to claim 17, wherein the data transmission scheduling management function is a round-robin scheduling scheme.

29. The forwarder device according to claim 17, wherein the data transmission scheduling management function aggregates the streams related to multi-hop traffic.

30. The forwarder device according to claim 17, wherein single-hop traffic in the second network is allocated in direct links during an absence of a forwarder device in the second network.

31. A method of operating a forwarder device for forming a communication interface between a first network and a second network of a network array and for managing data transmission scheduling, comprising:
    forming a communication interface between the first network and the second network using the forwarder device as one of a plurality of first nodes of the first network and as one of a plurality of second nodes of the second network, wherein the first network is an infrastructure network and the second network is an ad-hoc network, and wherein the forwarder device is configured to operate as a slave in the first network and as a master in the second network; and
    distinguishing, in the forwarder device, between data for transmission between the first and second networks and data for transmission within the first network and data for transmission within the second network;
    implementing, in the forwarder device, a data transmission scheduling management function for controlling and regulating data to be transmitted between the first network and the second network and data to be transmitted within the first network or within the second network;
    communicating by the forwarder device with the first network using a first operation frequency and communicating by the forwarder device with the second network using a second operation frequency which is different from the first operation frequency.

32. A method of operating a forwarder device for forming a communication interface between a first network and a second network of a network array and for managing data transmission scheduling, comprising:
    forming a communication interface between the first network and the second network using the forwarder device as one of a plurality of first nodes of the first network and as one of a plurality of second nodes of the second network; and
    implementing, in the forwarder device, a data transmission scheduling management function for controlling and regulating data to be transmitted between the first network and the second network and data to be transmitted within the first network or within the second network;
    communicating by the forwarder device with the first network using a first operation frequency and communicating by the forwarder device with the second network using a second operation frequency which is different from the first operation frequency;
    wherein multi-hop-uplink requests are negotiated including:
    checking, using the second operation frequency, at least one traffic request from at least one of the second nodes using an Admission Control Unit provided in the forwarder device;
    refusing a traffic request, if it is determined that no sufficient capacity is available in the forwarder device;
    in case that a traffic request is not refused, waiting to switch from the second operation frequency to the first operation frequency and forwarding the request to a communication hub forming one of the first nodes of the first network using the first operation frequency;
    checking a response from the communication hub in the Admission Control Unit in the forwarder device;
    waiting to switch from the first operation frequency to the second operation frequency and forwarding the response to the at least one of the second nodes.

33. The method according to claim 32, wherein multi-hop-downlink requests are negotiated including
    responding to at least one Schedule request from a communication hub forming one of the first nodes by sending at least one Traffic Stream Request using the first operation frequency;
    waiting for a reception of a traffic stream request from the communication hub using the first operation frequency and checking a capacity using an Admission Control Unit in the forwarder device;
    deleting the traffic stream using the first operation frequency, if it is determined that there is no sufficient capacity available;
    in case that the traffic stream is not deleted, waiting to switch from the first operation frequency to the second operation frequency and sending a schedule request to one of the second nodes using the second operation frequency.

* * * * *